April 17, 1962  F. R. GRUNER  3,029,836

MECHANICAL SIGNAL DEVICE

Filed April 20, 1959

INVENTOR.
FREDERICK R. GRUNER

BY *Lawrence J. Winter*

ATTORNEY

United States Patent Office 3,029,836
Patented Apr. 17, 1962

3,029,836
MECHANICAL SIGNAL DEVICE
Frederick R. Gruner, Westfield, N.J., assignor to Purolator Products, Inc., Rahway, N.J., a corporation of Delaware
Filed Apr. 20, 1959, Ser. No. 807,638
4 Claims. (Cl. 137—557)

The present invention relates to a signal device for indicating when a filter requires servicing and more particularly to a mechanical type filter signal device.

An object of the present invention is to provide a filter with a signal device operatively connected to the by-pass valve therein to enable an operator to know when the filter needs cleaning or replacement.

Another object of the present invention is to provide a signal device for the filter actuated in response to the unseating of the by-pass valve which valve has no horizontal forces or stresses acting thereon.

Another object of the present invention is to provide a filter signal device operatively connected to the valve stem of a filter by-pass valve which eliminates any side forces acting on the valve stem and prevents cocking of the valve disc when seated and leakage of fluid therearound.

Another object of the present invention is to provide a signal device for a filter actuated in response to the longitudinal movement of the by-pass valve which device applies no horizontal force on the valve and eliminates cocking of it.

Figure 1:
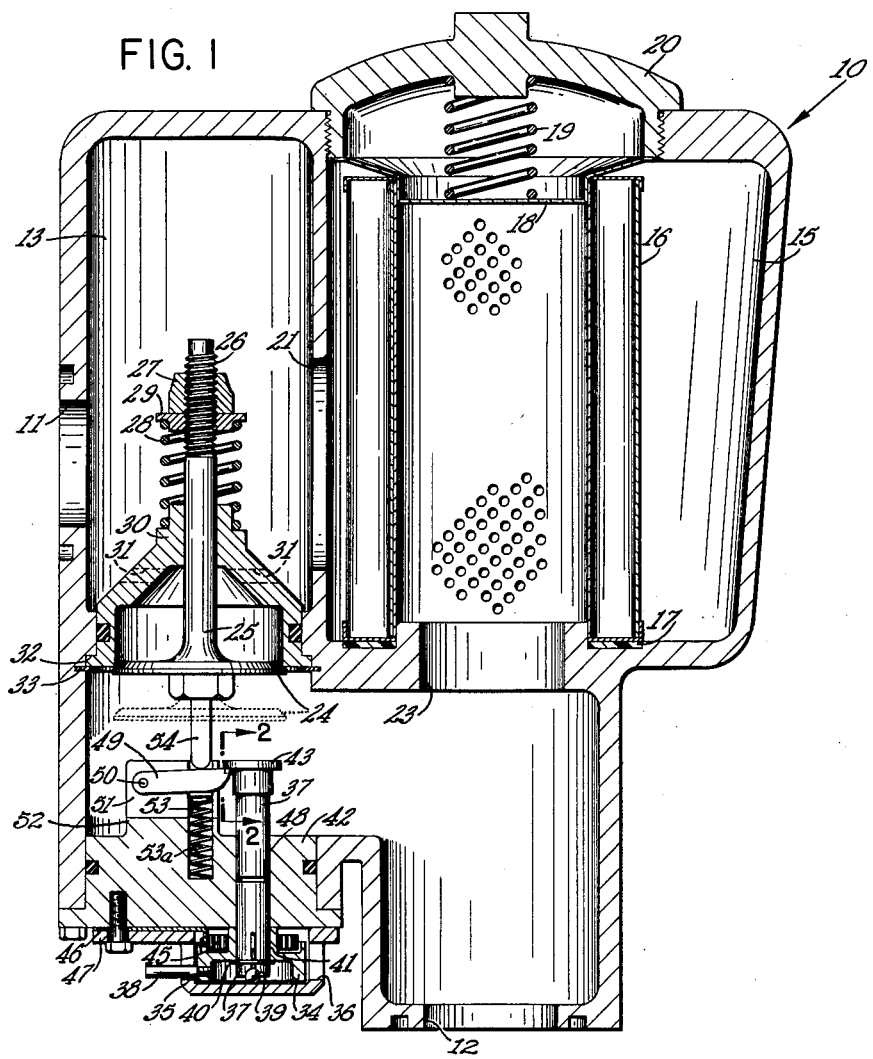
Figure 3:
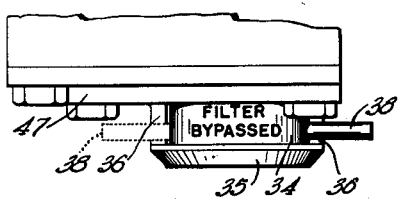
Figure 2:
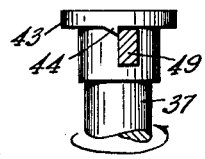

Various other objects and advantages of the invention will be readily apparent from the following description when considered in connection with the accompanying drawing forming a part thereof, and in which:

FIG. 1 is a side elevational view, partly in section, illustrating the signal device in its non-signalling position, FIG. 2 is a section taken on lines 2—2 of FIG. 1, and FIG. 3 is a fragmentary enlarged view of the signal device in a signal position.

Referring to the drawings, the reference numeral 10 designates a filter housing or casing having an oil inlet 11 and an outlet 12 therein for flowing oil to be cleaned through the filter. The inside of the filter casing is partitioned into a by-pass chamber 13 and a filter chamber 15. An annular filter element 16 is seated on a gasket 17 in the filter chamber and has its upper end sealed by member 18 which extends into the center tube of the filter and is hel dthereagainst by compression spring 19 mounted on the inner surface of a detachable filter cover 20. The filter element itself does not form any part of the invention and may be a convoluted wire wound type element, sintered metal, a resin impregnated pleated paper type filter, or the like.

Oil to be filtered enters inlet 11, and flows through chamber 13 and opening 21 between the by-pass and filter chambers passing in an outside in direction through filter element 16. The contaminants in the oil are deposited on the outer surface of the filter element after which clean oil is discharged from chamber 15 through opening 23 and passes from the filter unit through outlet 12.

A by-pass or relief valve assembly is provided in the casing and comprises a disc type valve 24 secured on a valve stem 25 having an externally threaded upper end 26 on which is mounted an adjustable nut 27. A compression spring 28 is mounted around the valve stem between an adjustable stop member 29 and the valve spider 30. Spider 30 is provided with spaced openings 31 therein to permit oil to act against the upper surface of disc valve. The spider is secured in chamber 13 by shoulder 32 thereon and a snap ring 33. Valve 24 is held seated or closed during normal operation of the filter by compression spring 28.

The signal device embodied in the invention comprises an annular member 34 enclosed in a cylindrical cover or housing 35 having a cut out or slotted opening 36 in the side wall thereof. Annular member 34 is fixed by a key or the like to a rotatable shaft 37 extending through the filter housing or casing. A handle or lever 38 is threaded into member 34 through the slotted opening 36 in the cover sidewall. The end of rod 37 extending into cover 35 is provided with a ball bearing 39 on the end thereof to take up any end thrust on the shaft and to prevent axial movement of the shaft in one direction while a snap ring 40 and hub portion 41 of member 34 abutting casing insert member 42 prevents movement in the opposite direction. The opposite end of shaft 37 is provided with a cam wheel 43 on which is a cam 44. A coiled torsion spring 45 is mounted around hub 41 and has one end fixed to a plate 46 and the other end fixed to shaft 37. Plate 46 is secured between the base 47 of the cover member and insert member 42 both of which are bolted to the filter casing. Leakage of oil out of the filter casing along shaft 37 is prevented by an O-ring seal 48 disposed in a recess provided in the shaft.

The actuator mechanism for shaft 37 and the signal device comprises an arm or lever 49 pivotally connected as at 50 in a slot 51 extending through depending portion 52 of insert member 42. A bore or recess 53 is provided in member 42 adjacent slot 51 and in alignment with valve stem 25 in which is disposed a compression spring 53a that normally urges the end of lever 49 against the surface of cam wheel 43. Cam 44 abuts against the side of lever 49, as shown in FIGS. 1 and 2, when the signal device is in its non-signalling position and disc valve 24 is seated. A valve stem extension 54 is provided on the end of valve stem 25 in alignment with bore 53 and extends therein to move lever 49 out of contact with cam 44.

In operation when the oil passing through the filter contaminates filter element 16 therein and causes the differential pressure across the filter element to increase above a predetermined value, valve disc 24 is unseated, as shown in dotted lines in FIG. 1, and valve stem 25 and extension 54 move downwardl until extension 54 contacts lever 49 and moves it downwardly against the spring action of spring 53a to release the end of lever 49 from contact with cam 44. This causes shaft 37 to be spun or rotated by torsion spring 45 and signal device 34 fixed to the shaft to also rotate into its signal position and handle 38 to move to the right into the position shown in FIG. 3.

When the filter has been serviced, the signal device 34 is manually reset to its non-signalling position by rotating handle 38 to the left in the position shown in FIG. 1 to thereby rewind spring 45 and again set lever 49 against cam 44.

It will be particularly noted in the present invention that the signal device eliminates any horizontal or side force acting against valve stem 25 and its extension 54 since the signal device is actuated by longitudinal movement of the valve stem transmitted thereto through the transversely extending lever 49. Also, during normal operation of the filter, there is no connection between the valve stem and signal device as the valve stem and lever are not in contact with each other, but there is a clearance between them.

Inasmuch as various changes may be made in the form, location and relative arrangement of the several parts without departing from the essential characteristics of the invention, it will be understood that the invention is not to be limited except by the scope of the appended claims.

What is claimed is:
1. In combination an indicator and a by-pass valve normally maintained in a seated position and having a valve stem comprising, a rotatable signal device for indicating the valve is unseated, a rotatable member connected to the device for rotating it to a signal position, means for rotating said rotatable member, lever means preventing said rotatable member from rotating, said lever means being disposed in alignment with said valve stem and out of contact therewith when said valve is seated, said lever means being disposed to be moved by said valve stem when the by-pass valve unseats to release said rotatable member.

2. In combination an indicator and a by-pass valve normally maintained in a seated position and having a valve stem comprising, a rotatable signal device for indicating the valve is unseated, a rotatable shaft connected to the device for rotating it to a signal position, means for rotating said rotatable shaft, a cam on said rotatable shaft, a pivotally connected lever having its free end positioned to engage said cam to prevent said shaft from rotating, said lever being disposed in alignment with said valve stem and out of contact therewith when said valve is seated, said lever being disposed to be moved by said valve stem when said valve unseats to disengage said cam and release said shaft.

3. The indicator of claim 2 wherein said rotatable shaft is disposed out of alignment with said valve stem and extends parallel with said valve stem, and said lever extends transversely of said shaft between said valve stem and said shaft.

4. In combination an indicator and a by-pass valve disposed in a casing and normally maintained in a seated position having a valve stem comprising, a rotatable signal device disposed on the outside of the casing for indicating the valve is unseated, a rotatable shaft extending through the casing and connected to said device for rotating it to a signal position, said shaft extending parallel to and being out of alignment with said valve stem, a cam on the inner end of said shaft within the casing, a lever housing in alignment with said valve stem having a slot extending therethrough, a lever disposed in said slot and having one end pivotally connected to said housing, the free end of said lever engaging said cam to prevent rotation of said shaft when said valve is seated, said lever means being disposed to be moved by said valve stem to release said rotatable shaft when said valve unseats.

References Cited in the file of this patent

UNITED STATES PATENTS

| | | |
|---|---|---|
| 1,201,492 | Newton | Oct. 17, 1916 |
| 2,633,098 | Ellis | Mar. 31, 1953 |
| 2,678,134 | Middleton | May 11, 1954 |
| 2,729,339 | McCoy | Jan. 3, 1956 |
| 2,779,304 | Robinson | Jan. 29, 1957 |
| 2,878,936 | Scavuzzo et al. | Mar. 24, 1959 |
| 2,879,892 | Frakes | Mar. 31, 1959 |